3,573,305
(3-AMINO-PYRAZINOYL)SULFAMIDES AND THEIR PREPARATION

Edward J. Cragoe, Jr., and John B. Bicking, Lansdale, Pa., assignors to Merck & Co., Inc., Rahway, N.J.
No Drawing. Filed Dec. 30, 1968, Ser. No. 788,097
Int. Cl. C07d 51/76
U.S. Cl. 260—250                10 Claims

ABSTRACT OF THE DISCLOSURE (3-aminopyrazinoyl)sulfamides that exhibit saluretic and diuretic properties are described. The products are prepared by the reaction of a 4H-pyrazino[2,3-d][1,3]oxazin-4-one and a sulfamide in the presence of a tertiary amine followed by hydrolysis or by the reaction of a 3-(3-aminopyrazinoyloxy)acrylamide and a sulfamide. The starting substance of this latter reaction is prepared by the reaction of a 3-aminopyrazinoic acid and an isoxazolium salt.

---

This invention is concerned with novel (3-aminopyrazinoyl)sulfamides that possess useful saluretic and diuretic properties as well as novel processes for their preparation. Because of the unique properties possessed by these compounds, they are useful in the treatment or management of edema and other abnormalities resulting from the retention of excess quantities of sodium and fluids by the animal organism.

The (3-aminopyrazinoyl)sulfamides of this invention have the structural formula

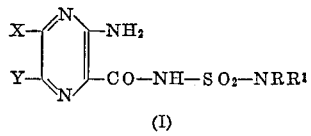

(I)

wherein X is selected from:
(1) hydrogen,
(2) halogen, particularly chloro and bromo,
(3) lower alkyl preferably having from 1 to about 5 carbon atoms in either straight or branched chain configuration,
(4) phenyl or substituted phenyl, and
(5) amino of the structure —NR²R³ wherein —NR²R³ represents an unsubstituted or a substituted amino group wherein R² is selected from:
(A) hydrogen
(B) alkyl preferably lower alkyl of from 1 to about 6 carbon atoms and either straight or branched chain and either saturated or unsaturated, for example, methyl, ethyl, propyl, isopropyl, allyl, propenyl, butyl, isobutyl, secondary butyl, pentyl, isopentyl, neopentyl, hexyl and the like;

R³ is selected from:
(A) hydrogen,
(B) alkenyl, preferably lower alkenyl of from 3 to about 5 carbon atoms, e.g., allyl, propenyl or the like,
(C) alkynyl, preferably lower alkynyl of from 3 to 5 carbon atoms, e.g., propargyl and the like,
(D) lower cycloalkyl of from 3 to about 7 carbon atoms, e.g., cyclopropyl, cyclopentyl, cyclohexyl, cycloheptyl and the like,
(F) mononuclear aryl, especially phenyl, either unsubstituted or substituted, such as with halo, e.g., chloro or bromo or fluoro, lower alkyl of from 1 to about 3 carbon atoms, e.g., methyl, ethyl and propyl, or lower alkoxy, e.g., methoxy, ethoxy, propoxy and the like,
(F) alkoxy, preferably lower alkoxy of from 1 to 4 carbon atoms, e.g., methoxy, ethoxy, isopropoxy and the like,
(G) amino,
(H) alkyl, preferably lower alkyl of from 1 to about 6 carbon atoms either straight or branched chain such as methyl, ethyl, propyl, isopropyl, butyl, isobutyl, secondary butyl, tertiary butyl, pentyl, isopentyl, neopentyl, hexyl and the like, either unsubstituted or substituted with one or more substituents selected from
  (a) hydroxy,
  (b) halogen, such as chloro, bromo, and fluoro,
  (c) lower cycloalkyl of from 3 to about 6 carbon atoms, e.g., cyclopropyl, cyclopentyl, cyclohexyl and the like,
  (d) furyl,
  (e) mononuclear aryl, especially phenyl, either unsubstituted or substituted with, for example, halo, e.g., chloro, bromo or fluoro, lower alkyl of from 1 to about 3 carbon atoms, e.g., methyl, ethyl or propyl, or lower alkoxy of from 1 to about 3 carbon atoms, e.g., methoxy, ethoxy, propoxy and the like,
  (f) di-lower alkylamino; and when R² and R³ are lower alkyl they can be linked together to form a 5- or 6-membered heterocyclic ring with the nitrogen atom to which they are attached forming the structure

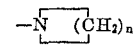

wherein n represents the numeral 4 or 5; Y is selected from:
(1) hydrogen,
(2) halogen, such as chloro, bromo and iodo,
(3) lower alkyl advantageously having from 1 to 5 carbon atoms, such as methyl, ethyl, propyl, butyl, amyl or the branched chain lower alkyls as isopropyl, isobutyl, secondary butyl, tertiary butyl, neopentyl and the like,
(4) mononuclear aryl, preferably phenyl,
(5) lower alkylthio and lower alkylsulfonyl wherein the alkyl moiety advantageously has from 1 to 3 carbon atoms,
(6) phenyl-lower alkylthio and phenyl-lower alkylsulfonyl wherein the alkyl moiety has from 1 to 3 carbon atoms,
(7) and the group —NR⁴R⁵ wherein R⁴ is selected from hydrogen and lower alkyl and
R⁵ is selected from lower alkyl and phenyl-lower alkyl, and
R⁴ and R⁵ can be linked together to form with the nitrogen to which they are attached preferably the piperidino radical;

R is selected from:
(1) hydrogen,
(2) alkyl, preferably, lower alkyl of from 1 to 5 carbon atoms and of either straight or branched chain configuration, such as methyl, ethyl, propyl, isopropyl, butyl, amyl and the various branched chain isomers thereof,
(3) phenyl and
(4) phenalkyl wherein the alkyl moiety has 1 to 3 carbons; and R¹ is selected from:
(1) hydrogen and
(2) alkyl, preferably lower alkyl of the type described above as a member of the R groups.

The products of this invention can be prepared by various methods such as by the reaction of a pyrazinooxazinone with sulfamide or by reacting the sulfamide with the very reactive 3-(3-aminopyrazinolyoxy)acrylamide which itself is prepared by reaction between a pyrazinoic acid and an isoxazolium salt.

The preparation of the compounds by reaction of a pyrazinooxazinone and the sulfamide can be illustrated by the following reaction scheme:

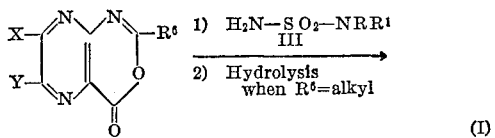

(I)

The above reaction readily takes place between the pyrazinooxazinone (II), wherein $R^6$ represents hydrogen and lower alkyl, and the sulfamide (III) at room temperature. The reaction is carried out in the presence of a basic substance, triethylamine being quite suitable although other basic materials can be employed such as pyridine and other tertiary amines such as trimethylamine, tripropylamine and the like. A solvent also generally is employed and acetonitrile, dimethylformamide, dimethyl sulfoxide, dimethyl sulfone, tetrahydrofuran, and the like can be used for this purpose. In those instances where $R^6$ is lower alkyl the reaction of II and III produces the 3-acylamino product which upon hydrolysis gives the 3-amino product desired.

The preparation of the novel products of this invention by reaction of a sulfamide with a 3-(3-aminopyrazinoyloxy)acrylamide can be illustrated by the following reaction scheme:

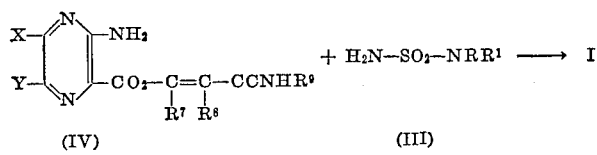

wherein X and Y have the meaning assigned above; $R^7$ represents lower alkyl having from 1 to about 3 carbon atoms or unsubstituted or substituted phenyl, wherein the substituent is a lower alkyl having 1 to 3 carbons or a sulfonate ($-SO_3-$); $R^8$ represents hydrogen or a hydrocarbon radical which when linked to $R^7$ forms with the carbon atoms to which $R^7$ and $R^8$ are joined an orthophenylene group; and $R^9$ represents lower alkyl having from 1 to 5 carbon atoms. The above reaction is carried out in substantially the same manner as the reaction between the pyrazinooxazinone and the sulfamide, i.e., at room temperature in the presence of a basic substance and a solvent of the types described above.

The acrylamide, IV, can be prepared from a 3-aminopyrazinoic acid and an isoxazolium salt according to the following reaction scheme:

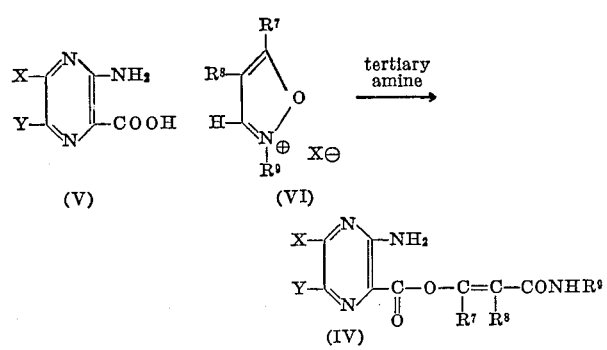

The X, Y and R's in the above structures have the meanings assigned above. Approximately equivalent amounts of a pyrazinoic acid, V, an isoxazolium salt, VI, and a tertiary amine, are dissolved in a solvent and stirred. Generally the pyrazinoic acid and tertiary amine such as a tri(lower alkyl)amine, e.g., trimethylamine, triethylamine, tripropylamine or the like are dissolved in a solvent such as dimethylformamide, dimethyl sulfoxide, dimethyl sulfone, acetonitrile, tetrahydrofuran or the like, preferably dimethylformamide or acetonitrile, and stirred for a period of from a few minutes to several hours. The isoxazolium salt then is added and the mixture stirred for from about one to about four hours, usually about two hours at ambient temperature, although gentle heating up to about 50° C. can be employed. The (3-aminopyrazinoyloxy) acrylamide, IV, usually is sufficiently stable to be isolated and purified and is often isolated simply by diluting the reaction mixture with water which precipitates it. Alternatively, IV may be obtained by evaporation of the reaction mixture. These pyrazinoyloxyacrylamides then can be recrystallized, if desired, from a polar organic solvent, such as acetonitrile, isopropyl alcohol or the like.

It is possible, and sometimes preferable, not to isolate these intermediate pyrazinoyloxyacrylamides, but rather to proceed directly with the process of this invention wherein this intermediate is used in situ and caused to react with a mixture of the sulfamide and base to provide the desired substituted pyrazinoylsulfamide, I. In this instance about one hour after the reagents V and VI and the tertiary amine have been mixed, the sulfamide III and an equivalent quantity of base are added and the reaction mixture is stirred at ambient temperature. The resulting product I then is isolated by dilution of the reaction mixture with water and acidification with a dilute solution of mineral acid which precipitates the desired substituted pyrazinoylsulfamide.

Where it is found desirable to first isolate the intermediate pyrazinoyloxyacrylamides, IV, the reaction is conducted essentially as described above except that the preformed IV the sulfamide compound, (III) and the base are mixed in a solvent such as dimethylformamide, dioxane, dichloromethane, tetrahydrofuran, acetonitrile or t-butyl alcohol, or the like, preferably tetrahydrofuran or acetonitrile and the mixture is stirred at ambient temperature.

The intermediate pyrazinoic acids generally are prepared by the hydrolysis of the corresponding methyl esters (VII) as shown below. The hydrolysis is usually carried out using a solution of aqueous base, such as, sodium hydroxide or potassium hydroxide and a solvent such as, isopropyl alcohol, ethanol and the like, and refluxing the mixture for one to 10 hours. The pyrazinoic acid then is isolated by cooling and acidifying the mixture with an acid, such as hydrochloric acid, sulfuric acid and the like.

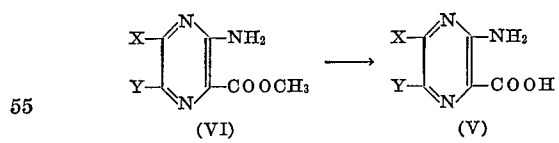

The products of this invention can be administered to man or animals in the form of pills, tablets, capsules, elixirs, injectable preparations and the like and can comprise one or more of the compounds of this invention as the only essential active ingredient of the pharmaceutical formulation, or the novel product(s) can be combined in pharmaceutical formulations with other diuretic agents or indeed other therapeutic agents. The products of this invention advantageously are administered at a dosage range of from about 5 mgs. per day to about 750 mgs. per day or at somewhat higher or lower dosage at the physician's discretion, preferably in subdivided amounts on a 2 to 4 times a day regimen. There formulations can be prepared by the usual methods for making unit dosage forms of compounds for oral or parenteral administration.

The following examples describe the preparation of the products of this invention by each of the methods described above. It will be understood that the examples are illustrative of the products of this invention that can be prepared by these methods and are not to be construed as limiting either as to the products prepared or the procedural conditions employed as described hereinbelow.

EXAMPLE 1

(3-amino-6-chloropyrazinoyl)sulfamide

Step A: Preparation of (3-acetamido-6-chloropyrazinoyl)sulfamide.—2-methyl - 6 - chloro-4H-pyrazino[2,3-d][1,3]oxazin-4-one (11.9 g.; 0.06 mole) is added in one portion to a stirred mixture of sulfamide (6.0 g.; 0.062 mole) and triethylamine (6.2 g.; 0.062 mole) in acetonitrile (40 ml.) at room temperature. After 20 minutes, the resulting solution is diluted with 120 ml. of ice water and neutralized by the addition of concentrated hydrochloric acid. The product crystallizes and is collected yielding 4.5 g. (25%) of (3-acetamido-6-chloropyrazinoyl)sulfamide, M.P. 167° C. (dec.). This product is used without purification in Step B.

Step B: Preparation of (3-amino-6-chloropyrazinyl)sulfamide.—(3 - acetamido-6-chloropyrazinoyl)sulfamide (4.5 g.; 0.015 mole) from Step A is heated for 15 minutes at 95° C. with 5% hydrochloric acid (50 ml.). Solution of the reactant is not observed but there is an obvious change in the appearance of the solid present. The newly formed solid product is collected and recrystallized from acetonitrile to obtain 2.4 g. (64%) of 3-amino-6-chloropyrazinoyl)sulfamide, M.P. 177.5–178.5° C.

Analysis.—Calculated for $C_5H_6ClN_5O_3S$ (percent): C, 23.86; H, 2.40; N, 27.83. Found (percent): C, 23.93; H, 2.51; N, 27.80.

EXAMPLE 2

(3,5-diamino-6-chloropyrazinoyl)sulfamide

Step A: Preparation of (3,5-dibutyramido-6-chloropyrazinoyl)sulfamide.—2-propyl - 6 - chloro-7-butyramido-4H-pyrazino[2,3-d][1,3]oxazin - 4 - one (24.8 g.; 0.08 mole) is added in one portion to a stirred mixture of sulfamide (11.5 g.; 0.12 mole) and triethylamine (12.1 g.; 0.12 mole) in acetonitrile (150 ml.) at room temperature. After 40 minutes, the resulting solution is diluted with 250 ml. of ice water and acidified to pH 4.0 with concentrated hydrochloric acid. The product crystallizes and is collected yielding 16.6 g. (51%) of (3,5-dibutyramido-6-chloropyrazinoyl)sulfamide, M.P. 171.5–173.5° C. (dec.). This product is used without purification in Step B.

Step B: Preparation of (3,5-diamino-6-chloropyrazinoyl)sulfamide.—(3,5-dibutyramido - 6 - chloropyrazinoyl)sulfamide (16.6 g.; 0.041 mole) from Step A is dissolved in ethanol (250 ml). The solution is heated to boiling, mixed with a solution of 5 g. sulfuric acid in 25 ml. of ethanol, and the resulting solution boiled under reflux for 90 minutes. The product crystallizes from the boiling solution. The mixture is cooled and the product collected and recrystallized from the mixture of ethanol and dimethylformamide. The resulting crystalline product, M.P. 170.5–172.5° C. contains about 1 mole of dimethylformamide of solvation. It is dried for 24 hours in vacuo at 100° C. over phosphorus pentoxide to give 4.7 g. (43%) of (3,5-diamino - 6 - chloropyrazinoyl)sulfamide, M.P. 193.5–194.5° C.

Analysis.—Calculated for $C_5H_7ClN_6O_3S$ (percent): C, 22.52; H, 2.65; N, 31.52; S, 12.02. Found (percent): C, 23.12; H, 2.84; N, 31.10; S, 12.27.

By following substantially the same procedure described in Example 1 other pyrazinoylsulfamides can be obtained. For example, by replacing the pyrazinooxazinone employed in Step A of Example 1 and by replacing the sulfamide, where indicated, by the reactants II and III identified in Table 1 there is obtained the pyrazinoylsulfamide product I also identified in the following Table I.

TABLE I $$X-\text{pyrazino-CH}_3 \xrightarrow[\text{(2) Hydrolysis}]{\text{(1) } H_2N-SO_2-NRR^1}$$

$$X-\text{pyrazinyl}(NH_2)-CO-NH-SO_2-NRR^1$$

| Ex. No. | X | Y | R | R¹ |
|---|---|---|---|---|
| 3 | CH₃— | H | H | H |
| 4 | Cl | Cl | CH₃— | H |
| 5 | C₆H₅— | Br | H | H |
| 6 | H | CH₃S— | H | H |
| 7 | H | CH₃SO₂— | H | H |
| 8 | H | C₆H₅CH₂S— | H | H |
| 9 | H | C₆H₅CH₂SO₂— | H | H |
| 10 | C₆H₅— | C₆H₅CH₂S— | C₆H₅— | H |
| 11 | CH₃— | C₆H₅CH₂S— | C₆H₅CH₂— | H |
| 12 | CH₃— | C₆H₅CH₂SO₂— | H | H |
| 13 | CH₃— | H | H | H |
| 14 | H | CH₃— | H | H |
| 15 | H | C₆H₅— | H | H |
| 16 | H | (CH₃)₂N— | C₂H₅— | H |
| 17 | H | (CH₂)₅N— | H | H |
| 18 | H | (CH₃)₂CHNH— | H | H |
| 19 | H | C₆H₅CH₂NH— | H | H |

The following preparations and examples describe the synthesis of various pyrazinoic acid starting materials, the intermediate pyrazinoyloxyacrylamides and its reaction with a sulfamide to give the products of this invention. To simplify the presentation, the preparation of the pyrazinoic acids will first be described followed by their use in preparing the pyrazinoyloxyacrylamides and then the reaction of these compounds with sulfamide to provide the novel pyrazinoylsulfamides of this invention.

PREPARATION OF PYRAZINOIC ACIDS

Preparation 1.—3,5-diamino-6-chloropyrazinoic acid

A mixture of finely ground methyl 3,5-diamino-6-chloropyrazinoate (101.31 g., 0.50 mole), isopropyl alcohol (1875 ml.) and 5% aqueous sodium hydroxide solution (625 ml.) is heated under reflux, with vigorous stirring, for one hour. Water (7500 ml.) is added to the cooled reaction mixture and the resulting clear solution is made acid to Congo red paper by the addition of concentrated hydrochloric acid. The light yellow solid which separates is collected and dried, yield 92.8 g. (98.4%), M.P. 230–1° C. (dec.). Recrystallization from dimethyl sulfoxide-water gives 3,5-diamino-6-chloropyrazinoic acid, M.P. 272° C. dec.

Analysis.—Calc'd for $C_5H_5ClN_4O_2$ (percent): C, 31.84; H, 2.67; N, 29.71. Found (percent): C, 32.10; H, 2.65; N, 29.57.

PREPARATION 2

3-amino-5-(2-propynylamino)-6-chloropyrazinoic acid

Step A: Preparation of methyl 3-amino-5-(2-propynylamino)-6-chloropyrazinoate.—2-propynylamine (3.60 g., 0.065 mole) is added to a suspension of methyl 3-amino-5,6-dichloropyrazinoate (7.20 g., 0.0325 mole) in dimethyl sulfoxide (80 ml.). The resulting clear solution is stirred for one hour and diluted with water (240 ml.). The solid which separates is collected and dried, 7.75 g. (99%), M.P. 160–2° C. Recrystallization from acetonitrile gives off-white prisms, M.P. 168–9° C. of methyl 3-amino-5-(2-propynylamino)-6-chloropyrazinoate.

Analysis.—Calc'd for $C_8H_9ClN_4O_2$ (percent): C, 44.92; H, 3.77; N, 23.28. Found (percent): C, 44.82; H, 3.73; N, 23.09.

Step B: Preparation of 3-amino-5-(2-propynylamino)-6-chloropyrazinoic acid.—Utilizing the procedure substantially as described in Preparation 1, but substituting for the methyl 3,5-diamino-6-chloropyrazinoate employed therein, an equimolar amount of methyl 3-amino-5-(2-propynylamino) - 6 - chloropyrazinoate there is produced 3-amino-5-(2-propynylamino)-6-chloropyrazinoic acid.

Employing substantially the same procedure as that described in Preparation 1, but substituting for the methyl 3,5-diamino-6-chloropyrazinoate used therein, equimolecular quantities of the methyl 3-amino-5-NR²R³-6-halopyrazinoates described in Table II there are produced the 3-amino-5-NR²R³-6-halopyrazinoic acids also described in Table II.

TABLE II

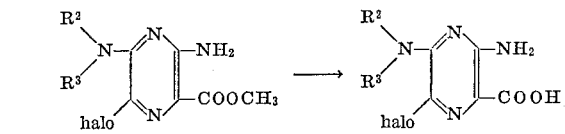

| Preparation | R² | R³ | Halo |
|---|---|---|---|
| 3 | H— | H | I |
| 4 | H— | H | Br |
| 5 | CH₃— | H | Cl |
| 6 | CH₂=CH—CH₂— | H | Cl |
| 7 | (cyclopentenyl) | H | Cl |
| 8 | (cyclopropyl)—CH₂— | H | Cl |
| 9 | (CH₃)₂N(CH₂)₂— | H | Cl |
| 10 | HOCH₂CH₂— | H | Cl |
| 11 | HOCH₂—(CHOH)₄—CH₂— (derived from D-glucamine) | H | Cl |
| 12 | CF₃CH₂— | H | Cl |
| 13 | (phenyl)—CH₂— | H | Cl |
| 14 | (F-phenyl)—CH₂— | H | Cl |
| 15 | (furyl)—CH₂— | H | Cl |
| 16 | (phenyl) | H | Cl |
| 17 | Cl—(phenyl)— | H | Cl |
| 18 | CH₃O— | CH₃— | Cl |
| 19 | NH₂— | CH₃— | Cl |
| 20 | CH₃— | CH₃— | Cl |
| 21 | —(CH₂)₄— | | Cl |

PREPARATION OF PYRAZINOYLOXY-ACRYLAMIDES

Preparation 22.—N-(t-butyl)-3-methyl-3-(3,5-diamino-6-chloropyrazinoyloxy)acrylamide A mixture of 3,5-diamino - 6 - chloropyrazinoic acid (1.90 g., 0.01 mole) and triethylamine (1.0 g., 0.01 mole) in dimethylformamide (20 ml.) is stirred for 10 minutes. N-(t-butyl) - 5 - methylisoxazolium perchlorate (2.40 g., 0.01 mole) is added and the resulting solution stirred for 2 hours. Water (100 ml.) is added and the solid which separates is collected and dried. The yield is 2.85 g. (87%); M.P. 171–6° C. Recrystallization from acetonitrile gives light yellow crystals, M.P. 187–9° C., of N-(t-butyl) - 3 - methyl - 3 - (3,5-diamino-6-chloropyrazinoyloxy)acrylamide.

*Analysis.*—Calc'd for $C_{13}H_{18}ClN_5O_3$ (percent): C, 47.63; H, 5.53; N, 21.37. Found (percent): C, 47.87; H, 5.55; N, 21.42.

Employing the procedure substantially as described in Preparation 22, but substituting for the 3,5-diamino-6-chloropyrazinoic acid and the N-(t-butyl) - 5 - methylisoxazolium perchlorate utilized therein, equivalent amounts of 3-amino - 5 - NR²R³ - 6 - halopyrazinoic acid and N-R⁹-5-R⁷-4-R⁸-isoxazolium salt respectively which are described in Table III, there are produced the N-R⁹-2-R⁸-3-R⁷-3-(3 - amino - 5 - NR²R³ - 6 - halopyrazinoyloxy)acrylamides, also described in Table III.

TABLE III

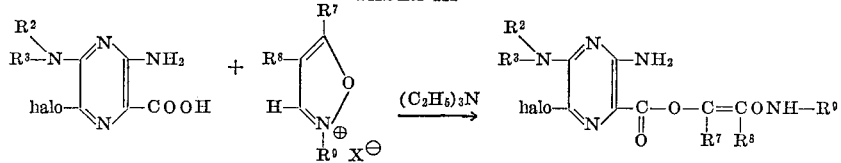

| Preparation | R² | R³ | R⁷ | R⁸ | R⁹ | X⁻ | Halo |
|---|---|---|---|---|---|---|---|
| 23 | H | H | (⁻O₃S-phenyl) | H | CH₃CH₂— | (¹) | I |
| 24 | H | H | (phenyl) | H | (CH₃)₃C— | ClO₄⁻ | Br |
| 25 | CH₂=CH—CH₂— | H | —CH=CH—CH=CH—² | CH₃— | | (2,4-dinitro-phenyl-SO₃⁻) | Cl |
| 26 | HC≡C—CH₂— | H | CH₃— | H | (CH₃)₃C— | ClO₄⁻ | Cl |
| 27 | (cyclopentenyl) | H | CH₃— | H | (CH₃)₃C— | ClO₄⁻ | Cl |
| 28 | (cyclopropyl)—CH₂— | H | ⁻O₃S-(phenyl) | H | CH₃CH₂— | (¹) | Cl |
| 29 | (CH₃)₂N(CH₂)₂— | H | CH₃— | H | (CH₃)₃C— | ClO₄⁻ | Cl |
| 30 | HOCH₂CH₂— | H | CH₃— | H | (CH₃)₃C— | ClO₄⁻ | Cl |
| 31 | HOCH₂(CHOH)₄CH₂— | H | —CH=CH—CH=CH—² | CH₃— | | (2,4-dinitro-phenyl-SO₃⁻) | Cl |

TABLE III.—Continued

| Preparation | $R^2$ | $R^3$ | $R^7$ | $R^8$ | $R^9$ | $X^\ominus$ | Halo |
|---|---|---|---|---|---|---|---|
| 32 | $CF_3CH_2-$ | H | phenyl | H | $(CH_3)_3C-$ | $ClO_4^\ominus$ | Cl |
| 33 | benzyl ($C_6H_5CH_2-$) | H | $CH_3-$ | H | $(CH_3)_3C-$ | $ClO_4^\ominus$ | Cl |
| 34 | 2-fluorobenzyl | H | $^\ominus O_3S$-phenyl- | H | $CH_3CH_2-$ | (¹) | Cl |
| 35 | furfuryl (furan-$CH_2-$) | H | $CH_3-$ | H | $(CH_3)_3C-$ | $ClO_4^\ominus$ | Cl |
| 36 | phenyl | H | $CH_3-$ | H | $(CH_3)_3C-$ | $ClO_4^\ominus$ | Cl |
| 37 | $Cl$-phenyl- | H | $-CH=CH-CH=CH-$ (²) | | $CH_3-$ | $O_2N$-phenyl($NO_2$)-$SO_2^\ominus$ | Cl |
| 38 | $CH_3O$ | $CH_3-$ | phenyl | H | $(CH_3)_3C-$ | $ClO_4^\ominus$ | Cl |
| 39 | $NH_2-$ | $CH_3-$ | $CH_3-$ | H | $(CH_3)_3C-$ | $ClO_4^\ominus$ | Cl |
| 40 | | $-(CH_2)_4-$ | $CH_3-$ | H | $(CH_3)_3C-$ | $ClO_4^\ominus$ | Cl |
| 41 | $CH_3-$ | $CH_3-$ | $CH_3-$ | H | $(CH_3)_3C-$ | $ClO_4^\ominus$ | Cl |
| 42 | $CH_3-$ | H | $CH_3-$ | H | $(CH_3)_3C-$ | $ClO_4^\ominus$ | Cl |

¹ The anion appears as part of the $R^7$ substituent; the product appears as the triethyl ammonium salt.
² This compound is not strictly an acrylamide but rather N-$R^9$-2-(3-amino-5-N $R^2R^3$-6-halopyrazinoyloxy)benzamide.

PREPARATION OF PYRAZINOYLSULFAMIDES

Example 20.—(3,5-diamino-6-chloropyrazinoyl)sulfamide

To a mixture of sulfamide (0.2 mole) and triethylamine (0.2 mole) in acetonitrile (150 ml.) is added in one portion N-(t-butyl) - 3 - methyl - 3 - (3,5 - diamino-6-chloropyrazinoyloxy)acrylamide (0.2 mole) with stirring at ambient temperature. After about 50 minutes, the resulting solution is diluted with ice water (250 ml.) and neutralized by the addition of concentrated hydrochloric acid. The solid which separates is collected and dried giving (3,5 - diamino - 6 - chloropyrazinoyl)sulfamide which upon mixed melting point with the product of Example 2, Step B, gives no depression.

The above procedure can be employed to prepare other pyrazinoylsulfamide products as illustrated by those described in the following table. The pyrazinoyloxyacrylamide, IV, identified in Table IV is substituted for that employed in Example 20 above and is reacted with the sulfamide III, also identified in the following table, to provide the desired pyrazinoylsulfamide I having the R, $R^1$, $R^2$, $R^3$ and halo substituents identified in Table IV.

TABLE IV $$\text{pyrazine}(R^2R^3N, NH_2, halo)\text{-}CO_2\text{-}C(R^7)=C(R^8)\text{-}CONHR^9 + H_2N-SO_2-NRR^1 \longrightarrow \text{pyrazine}(R^2R^3N, NH_2, halo)\text{-}CO-NH-SO_2-NRR^1$$

| Ex. No. | $R^2$ | $R^3$ | Halo | $R^7$ | $R^8$ | $R^9$ | R | $R^1$ |
|---|---|---|---|---|---|---|---|---|
| 21 | $CH{\equiv}C-CH_2-$ | H | Cl | $CH_3-$ | H | $(CH_3)_3C-$ | H | H |
| 22 | $CH_2{=}CH-CH_2-$ | H | Cl | $-CH=CH-CH=CH-$ | | $CH_3-$ | H | H |
| 23 | H | H | I | $^\ominus O_3S$-phenyl- | H | $C_2H_5-$ | $CH_3-$ | H |
| 24 | H | H | Br | $C_6H_5-$ | H | $(CH_3)_3C-$ | $CH_3-$ | $CH_3-$ |
| 25 | cyclopentyl (H) | H | Cl | $CH_3-$ | H | $(CH_3)_3C-$ | H | H |
| 26 | cyclopropyl-$CH_2-$ | H | Cl | $^\ominus O_3S$-phenyl- | H | $C_2H_5-$ | H | H |
| 27 | $(CH_3)_2-N-(CH_2)_2-$ | H | Cl | $CH_3-$ | H | $(CH_3)_3C-$ | H | H |
| 28 | $HO-(CH_2)_2-$ | H | Cl | $CH_3-$ | H | $(CH_3)_3C-$ | H | H |
| 29 | $HO-CH_2(CHOH)_4CH_2-$ | H | Cl | $-CH=CH-CH=CH-$ | | $CH_3-$ | H | H |
| 30 | $F_3CCH_2$ | H | Cl | $C_6H_5-$ | H | $(CH_3)_3C-$ | H | H |
| 31 | $C_6H_5CH_2-$ | H | Cl | $CH_3-$ | H | $(CH_3)_3C-$ | $C_6H_5CH_2$ | H |
| 32 | 2-fluorobenzyl | H | Cl | $^\ominus O_3S$-phenyl- | H | $C_2H_5-$ | H | H |

TABLE IV.—Continued

| Ex. No. | R² | R³ | Halo | R⁷ | R⁸ | R⁹ | R | R¹ |
|---|---|---|---|---|---|---|---|---|
| 33 |  | H | Cl | CH₃— | H | (CH₃)₃C— | H | H |
| 34 | C₆H₅— | H | Cl | CH₃— | H | (CH₃)₃C— | C₆H₅— | H |
| 35 |  | H | Cl | —CH=CH—CH=CH— | | CH₃— | H | H |
| 36 | CH₃O— | | | CH₃— | Cl | C₆H₅— | H | (CH₃)₃C— | C₂H₅— | H |
| 37 | H₂N— | | | CH₃— | Cl | CH₃— | H | (CH₃)₃C— | H | H |
| 38 | | —(CH₂)₄— | | | Cl | CH₃— | H | (CH₃)₃C— | H | H |
| 39 | CH₃— | | | CH₃— | Cl | CH₃— | H | (CH₃)₃C— | H | H |
| 40 | CH₃— | | | H | Cl | CH₃— | H | (CH₃)₃C— | H | H |

The novel compounds of this invention can be formulated in the usual oral or parenteral dosage forms for use in therapy in the treatment of conditions resulting from an abnormal electrolyte excretion pattern of an animal organism. It will be appreciated that the dosage of each individual compound will vary over a wide range depending upon the relative potency of the selected compound and also depending upon the age and weight of the particular patient to be treated and upon the particular ailment to be treated. For these reasons, tablets, pills, capsules and the like containing for example from 5 to 500 mgs. or more or less active ingredient can be made available for the symptomatic adjustment of the dosage to the individual patient. As each of the compounds of this invention can be incorporated in a dosage form similar to that described in the following example or other usual dosage forms suitable for oral or parenteral administration, which can be prepared by well-known methods, the following example is included herein solely to illustrate the preparation of a representative dosage form.

EXAMPLE 41

Dry-filled capsule containing 50 mgs. of (3,5-diamino-6-chloropyrazinoyl-sulfamide

| | Mgs./capsule |
|---|---|
| Active ingredient | 50 |
| Lactose | 445 |
| Magnesium stearate | 5 |
| Mixed powders | 500 |

Mix the active ingredient with the magnesium stearate and lactose and reduce to a No. 60 mesh powder. Encapsulate, filling 500 mgs. in each No. 0 capsule.

It is also contemplated to combine compounds of this invention in unit dosage form with other known diuretic agents or with hypotensive agents or steroids or other desired therapeutic agents in suitable dosage form.

While the above examples describe the preparation of certain compounds which are illustrative of the novel compounds of this invention and certain specific dosage forms suitable for administering the novel compounds, as well as certain methods for preparing the novel compounds, it is to be understood that the invention is not to be limited to the specific compounds described in the examples or by the specific reaction conditions provided in the examples for their preparation or by the specific ingredients included in the pharmaceutical preparation, that is to be understood to embrace variations and modifications thereof which fall within the scope of the appended claims.

What is claimed is:

1. A process for the preparation of (3-aminopyrazinoyl) sulfamide products having the structure

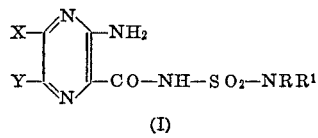

wherein a pyrazinooxazinone of structure II is caused to react with a sulfamide of structure III in the presence of a tertiary amine selected from the group consisting of pyridine and a (tri-lower alkyl)amine, followed, when R⁶ is lower alkyl, by hydrolysis,

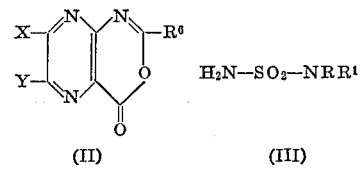

wherein in each of the preceding structures X is selected from the group consisting of hydrogen, halogen, lower alkyl, phenyl, and amino having the structure —NR²R³ wherein R² is selected from the group consisting of hydrogen and lower alkyl, and R³ is selected from the group consisting of hydrogen, lower alkenyl, lower alkynyl, C₃₋₇ cycloalkyl, phenyl, halophenyl, lower alkylphenyl, lower alkoxyphenyl, lower alkoxy, amino, lower alkyl, hydroxy-lower alkyl, halogen-lower alkyl, C₃₋₆ cycloalkyl-lower alkyl, furyl-lower alkyl, phenyl-lower alkyl, halophenyl-lower alkyl, lower alkylphenyl-lower alkyl, lower alkoxyphenyl-lower alkyl, di-lower-alkylamino-lower alkyl, and when R² and R³ are lower alkyl they can form with the nitrogen atom to which they are attached the structure

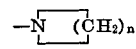

wherein n represents the numeral 4 or 5; Y is selected from the group consisting of hydrogen, halogen, lower alkyl, phenyl, lower alkylthio, lower alkylsulfonyl, phenyl-lower alkylthio, phenyl-lower alkylsulfonyl, the group —NR⁴R⁵ wherein R⁴ is selected from the group consisting of hydrogen and lower alkyl and R⁵ is selected from the group consisting of lower alkyl and phenyl-lower alkyl, and when R⁴ and R⁵ are each lower alkyl they can be linked together to form with the nitrogen to which they are attached the piperidino radical; R⁶ is selected from the group consisting of hydrogen and lower alkyl; R is selected from the group consisting of hydrogen, lower alkyl, phenyl and phenyl-lower alkyl; and R¹ is selected from the group consisting of hydrogen and lower alkyl.

2. A process as claimed in claim 1 wherein the reactants and end products R and R¹ each represent hydrogen.

3. A process as claimed in claim 1 wherein each of the reactants and end products R and R¹ each represent hydrogen, X represents amino and Y represents halogen.

4. A process for the preparation of (3,5-diamino-6-chloropyrazinoyl)sulfamide wherein 2-R⁶-6-chloro-7-amino-4-H-pyrazino[2,3-d][1,3]oxazin-4-one, wherein R⁶ is selected from the group consisting of hydrogen and lower alkyl, is caused to react with sulfamide and when R⁶ is lower alkyl the product obtained then is hydrolyzed.

5. A pyrazinoylsulfamide compound having the structure

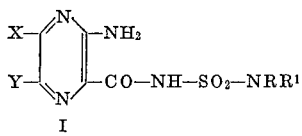

and pharmaceutically acceptable salts thereof wherein X is selected from the group consisting of hydrogen, halogen, lower alkyl, phenyl, and amino having the structure —$NR^2R^3$ wherein $R^2$ is selected from the group consisting of hydrogen and lower alkyl, and $R^3$ is selected from the group consisting of hydrogen, lower alkenyl, lower alkynyl, $C_{3-7}$ cycloalkyl, phenyl, halophenyl, lower alkylphenyl, lower alkoxyphenyl, lower alkoxy, amino, lower alkyl, hydroxy-lower alkyl, halogen-lower alkyl, $C_{3-6}$ cycloalkyl-lower alkyl, furyl-lower alkyl, phenyl-lower alkyl, halophenyl-lower alkyl, lower alkylphenyl-lower alkyl, lower alkoxyphenyl-lower alkyl, di-loweralkylamino-lower alkyl, and when $R^2$ and $R^3$ are lower alkyl they can form with the nitrogen atom to which they are attached the structure

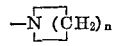

wherein $n$ represents the numeral 4 or 5; Y is selected from the group consisting of hydrogen, halogen, lower alkyl, phenyl, lower alkylthio, lower alkylsulfonyl, phenyl-lower alkylthio, phenyl-lower alkylsulfonyl, the group —$NR^4R^5$ wherein $R^4$ is selected from the group consisting of hydrogen and lower alkyl and $R^5$ is selected from the group consisting of lower alkyl and phenyl-lower alkyl, and when $R^4$ and $R^5$ are each lower alkyl they can be linked together to form with the nitrogen to which they are attached the piperidino radical; $R^6$ is selected from the group consisting of hydrogen and lower alkyl; R is selected from the group consisting of hydrogen, lower alkyl, phenyl and phenyl-lower alkyl; and $R^1$ is selected from the group consisting of hydrogen and lower alkyl.

6. A pyrazinoylsulfamide compound as claimed in claim 5 wherein R and $R^1$ each represent hydrogen.

7. A pyrazinoylsulfamide compound as claimed in claim 5 wherein R and $R^1$ each represent hydrogen and Y represents halogen.

8. A pyrazinoylsulfamide compound as claimed in claim 5 wherein R and $R^1$ each represent hydrogen, Y represents halogen and X represents amino of the structure —$NR^2R^3$ wherein $R^2$ and $R^3$ have the meaning assigned in claim 6.

9. A pyrazinoylsulfamide as claimed in claim 5 wherein R and $R^1$ each represent hydrogen, Y represents halogen and X is amino of the structure —$NH_2$.

10. (3,5-diamino-6-chloropyrazinoyl)sulfamide.

References Cited
UNITED STATES PATENTS 3,444,165    5/1969    Pollak et al.    260—250
3,472,848    10/1969    Cragoe et al.    260—250

NICHOLAS S. RIZZO, Primary Examiner

U.S. Cl. X.R.
424—250

UNITED STATES PATENT OFFICE
CERTIFICATE OF CORRECTION

Patent No. 3,573,305       Dated March 30, 1971

Inventor(s) Edward J. Cragoe, Jr. and John B. Bicking

It is certified that error appears in the above-identified paten and that said Letters Patent are hereby corrected as shown below:

In column 3, line 11, immediately following the arrow i the structural formula, insert ---I---; in line 35, structur change that part of the structure which reads $-CCNHR^9$    to read    $-CONHR^9$ In column 4, line 55, change the Roman numeral under the fir structure to read ---VII---. In column 5, line 22, correct "-chloropyrazinyl" to read --- -chloropyrazinoyl ---. In cc 6, in the reaction scheme immediately preceding Table I, in 5, insert ---II--- under the first structure and insert ---I] under the arrow and in line 10, insert ---I--- under the str ture.

Signed and sealed this 16th day of November 1971.

(SEAL)
Attest:

EDWARD M. FLETCHER, JR.
Attesting Officer

ROBERT GOTTSCHALK
Acting Commissioner of Pat